Sept. 23, 1958     A. A. VERCESI     2,853,586
ROTATABLE DRUM POTENTIOMETER

Filed Oct. 10, 1957     5 Sheets-Sheet 1

INVENTOR
A. A. Vercesi

BY

ATTORNEY

Sept. 23, 1958 A. A. VERCESI 2,853,586
ROTATABLE DRUM POTENTIOMETER
Filed Oct. 10, 1957 5 Sheets-Sheet 2

INVENTOR
A. A. Vercesi
BY Victor D. Borst
ATTORNEY

Sept. 23, 1958 A. A. VERCESI 2,853,586
ROTATABLE DRUM POTENTIOMETER
Filed Oct. 10, 1957 5 Sheets-Sheet 3

INVENTOR
A. A. Vercesi
BY
ATTORNEY

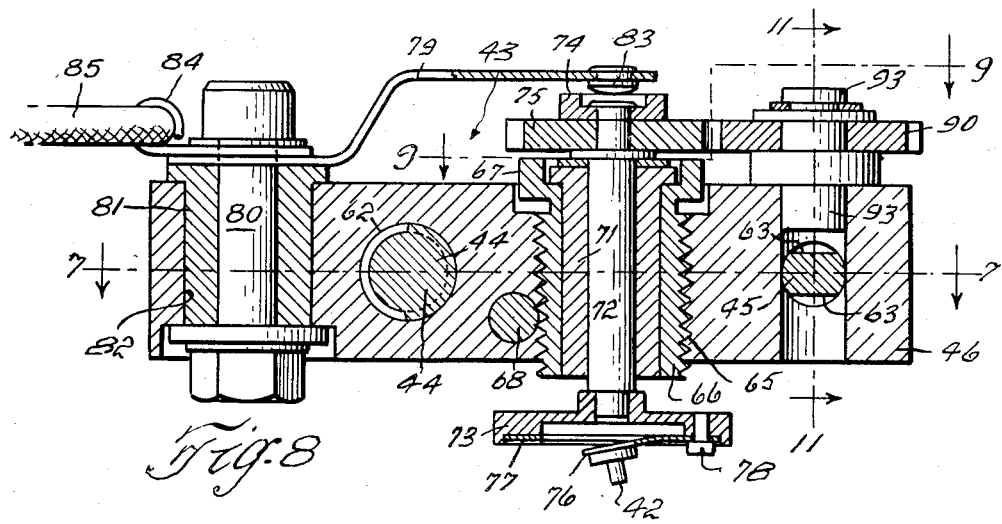
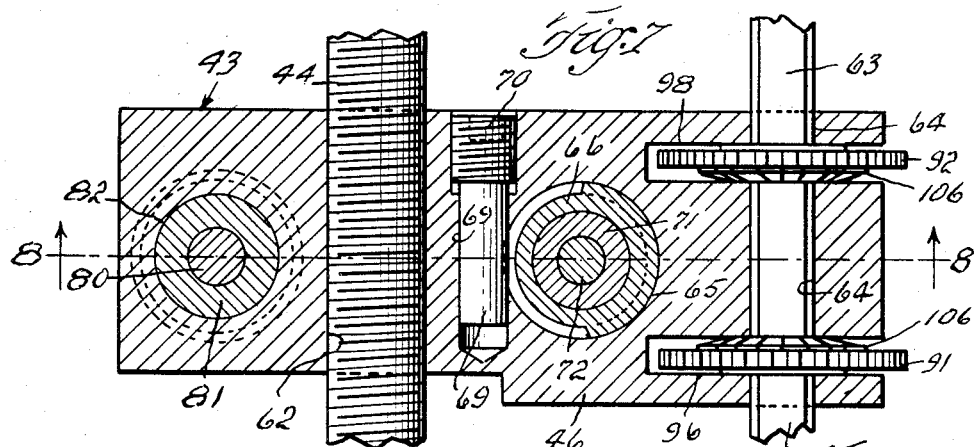
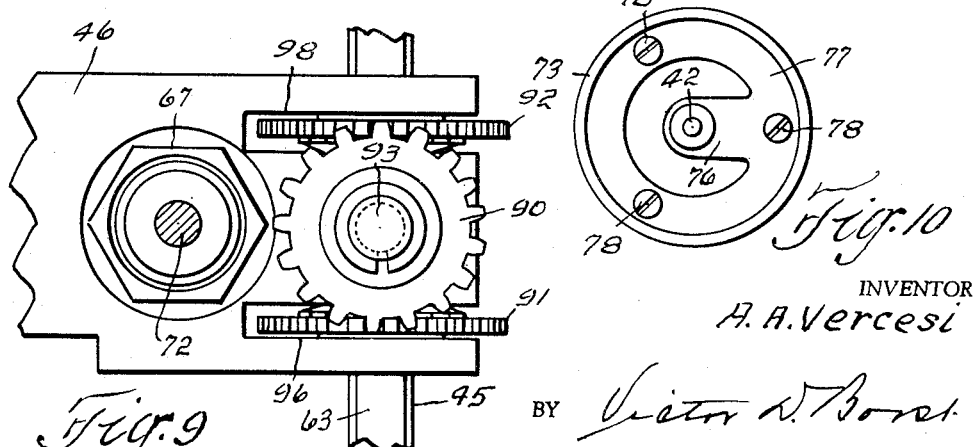

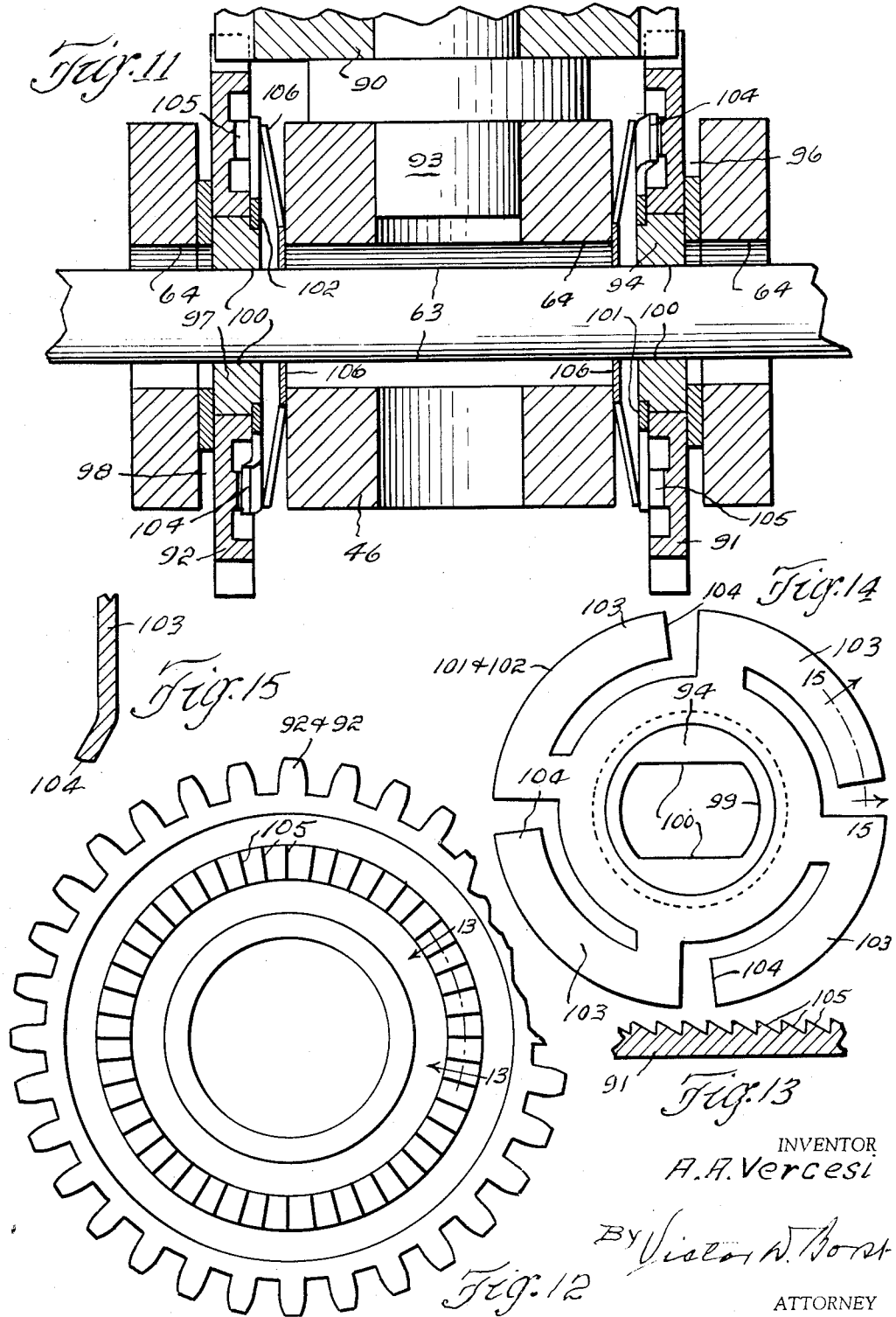

United States Patent Office 2,853,586
Patented Sept. 23, 1958

2,853,586
ROTATABLE DRUM POTENTIOMETER

Americo A. Vercesi, Scarsdale, N. Y., assignor to Sperry Rand Corporation, Ford Instrument Company Division, Long Island City, N. Y., a corporation of Delaware Application October 10, 1957, Serial No. 689,399

9 Claims. (Cl. 201—56)

This invention relates generally to variable electrical resistance instruments and especially to instruments of the potentiometer, rheostat or voltage divider type, in which a contact stylus is moved along a resistance element.

An object of the invention is to provide an improved instrument of the potentiometer type, in which a stylus is moved along a resistance wire which is helically wound a plurality of turns upon a rotatable drum, which is so constructed and arranged as to have very little operating friction, thereby permitting operation thereof with a minimum of power.

Another object of the invention is to provide an instrument of the aforesaid character which is of relatively simple construction, is highly accurate and sensitive, which will retain its accuracy under all conditions of use, and has a long life. In accomplishing the aforesaid objects, the invention comprises improvements in the drum construction, the stylus carriage construction and operation, the mounting of the stylus in the carriage, the take-off construction, and the provision of mechanism by which the stylus is continuously rotated in the same direction regardless of the direction of movement along the drum, all of which elements collectively make up the potentiometer.

The construction is such that all up and down movement of the stylus shaft, due to eccentricity of the drum, is eliminated, and the pressure with which the stylus engages the resistance element is reduced and maintained constant during operation. All grooving of the stylus is eliminated, and the wear of the stylus and the resistance element is materially reduced, thereby minimizing the creation of dust and noise incident to use.

Having stated the principal objects of the invention, other and more specific objects thereof will be apparent from the following specification and the accompanying drawings forming a part thereof, in which:

Fig. 7 is an enlarged detail horizontal section through the stylus carriage, the plane of the section being indicated by the lines 7—7 on Figs. 2 and 8;

Fig. 8 is a vertical section taken on the line 8—8 of Fig. 7;

Fig. 9 is a fragmentary detail sectional view the plane of which is indicated by the line 9—9 of Fig. 8;

Fig. 10 is a detail face view of the stylus and the mounting therefor;

Fig. 11 is a further enlarged sectional view through the clutch mechanism through which the stylus is rotated, the plane of the section being indicated by the line 11—11 of Fig. 8;

Fig. 12 is a face view of one of the two similar ratchet gears of the clutch mechanism;

Fig. 13 is a fragmentary detail section taken on the line 13—13 of Fig. 12;

Fig. 14 is a face view of one of the two similar pawls of the clutch mechanism; and Fig. 15 is a fragmentary detail section taken on the line 15—15 of Fig. 14.

Figure 1:
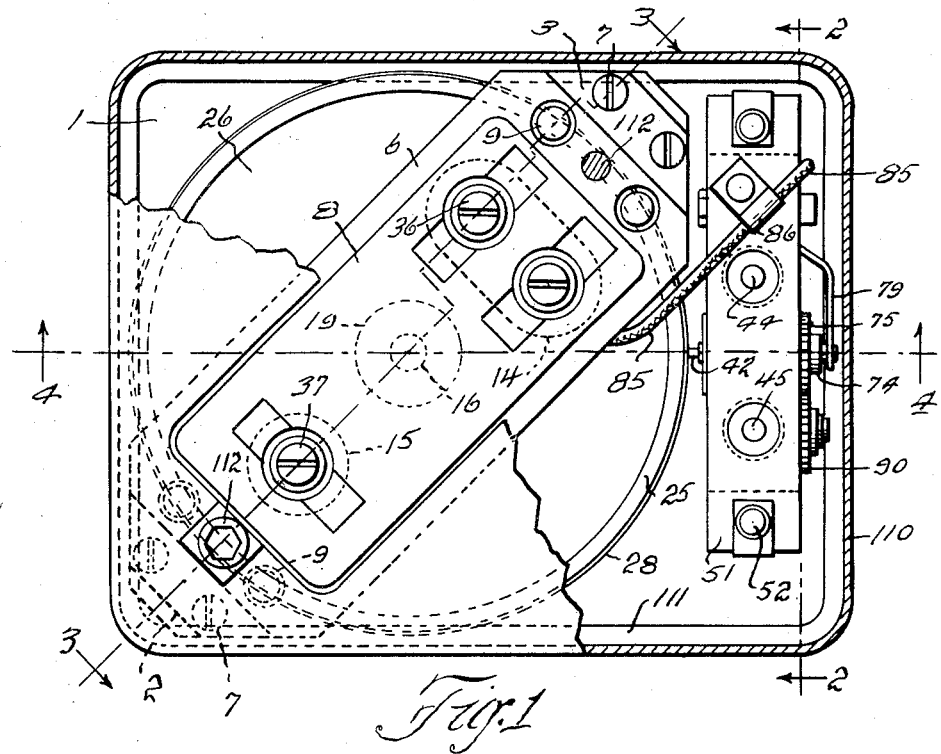
Fig. 1 is a plan view of a potentiometer constructed according to my invention, a portion of the casing being broken away for the purposes of illustration.
Figure 2:
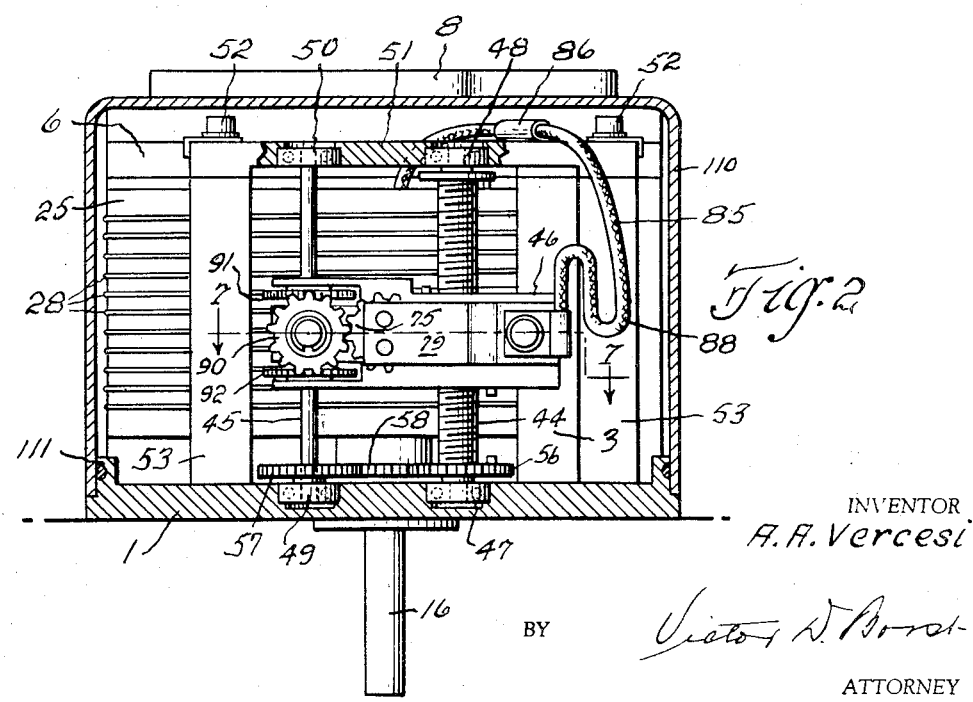
Fig. 2 is a transverse vertical section taken substantially on the line 2—2 of Fig. 1.
Figure 3:
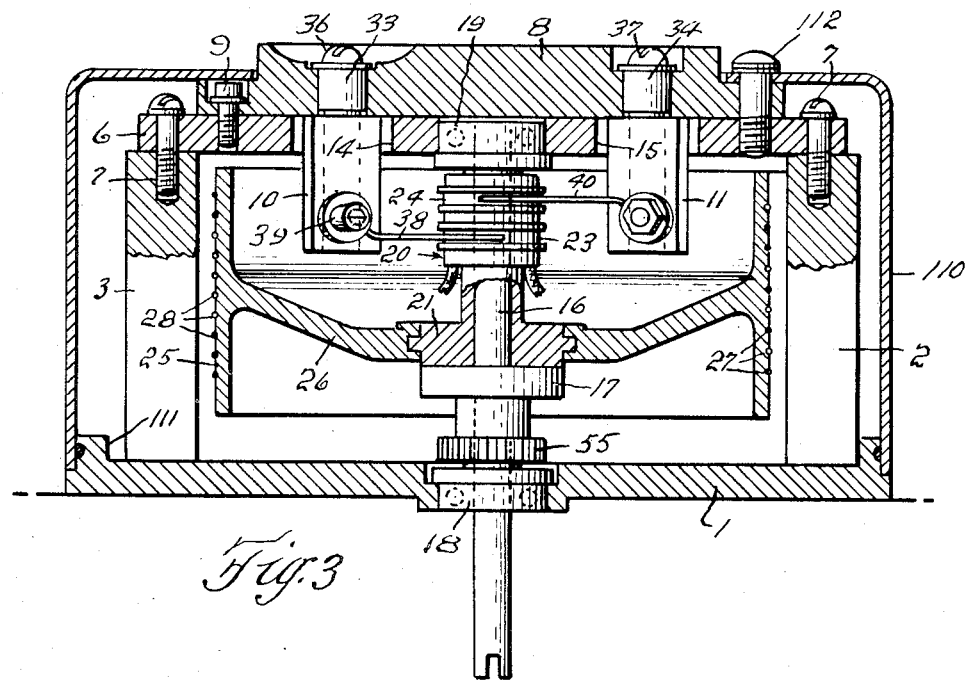
Fig. 3 is a diagonally disposed vertical section taken substantially on the line 3—3 of Fig. 1.
Figure 4:
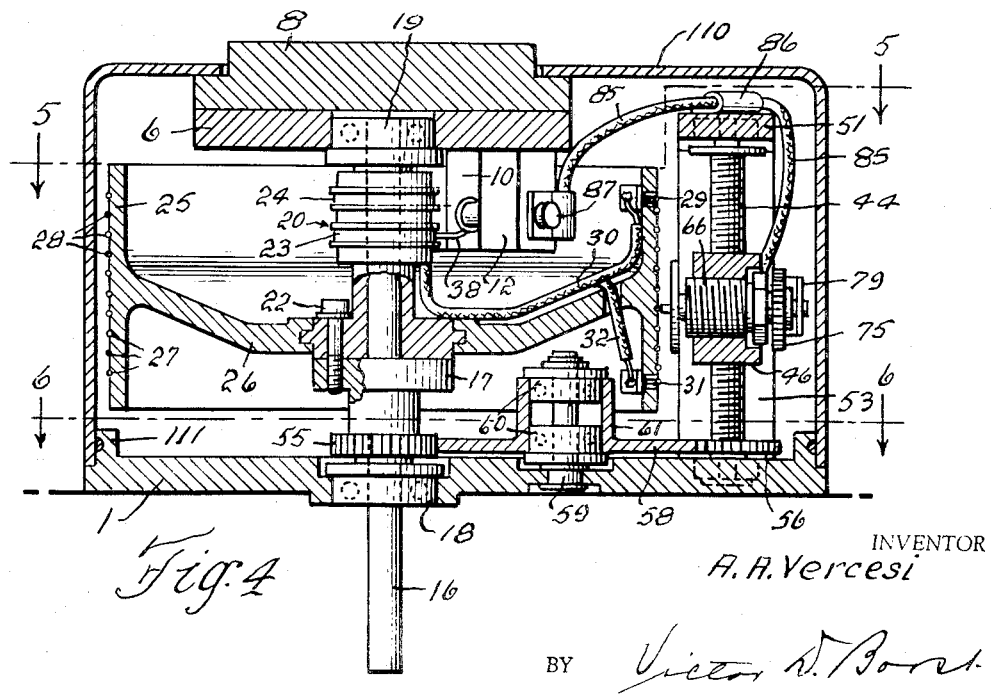
Fig. 4 is a longitudinal vertical section taken on the line 4—4 of Fig. 1.
Figure 5:
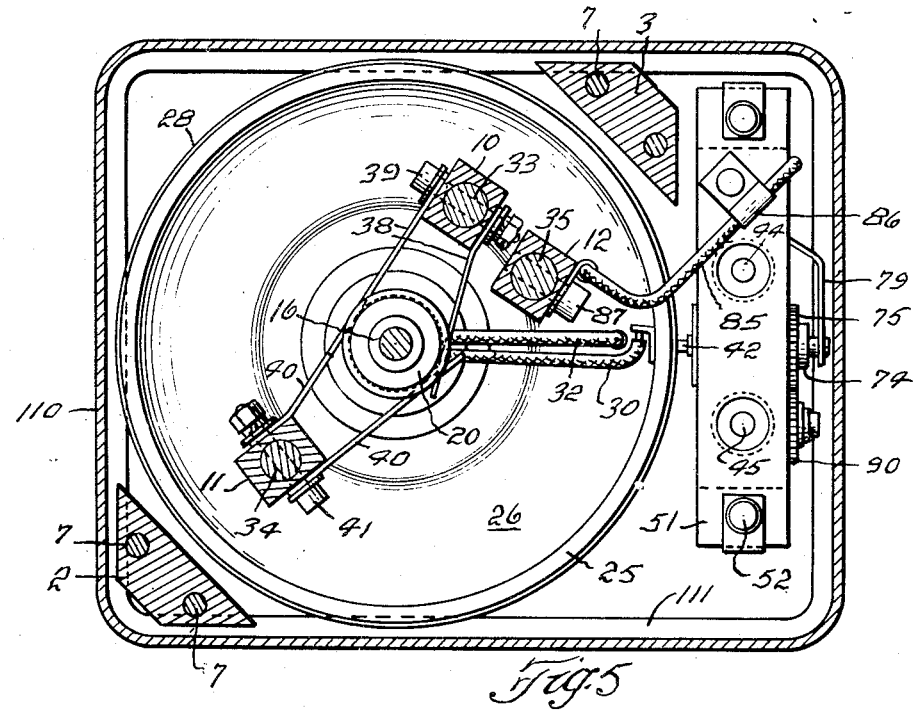
Fig. 5 is a horizontal section taken on the line 5—5 of Fig. 4.
Figure 6:
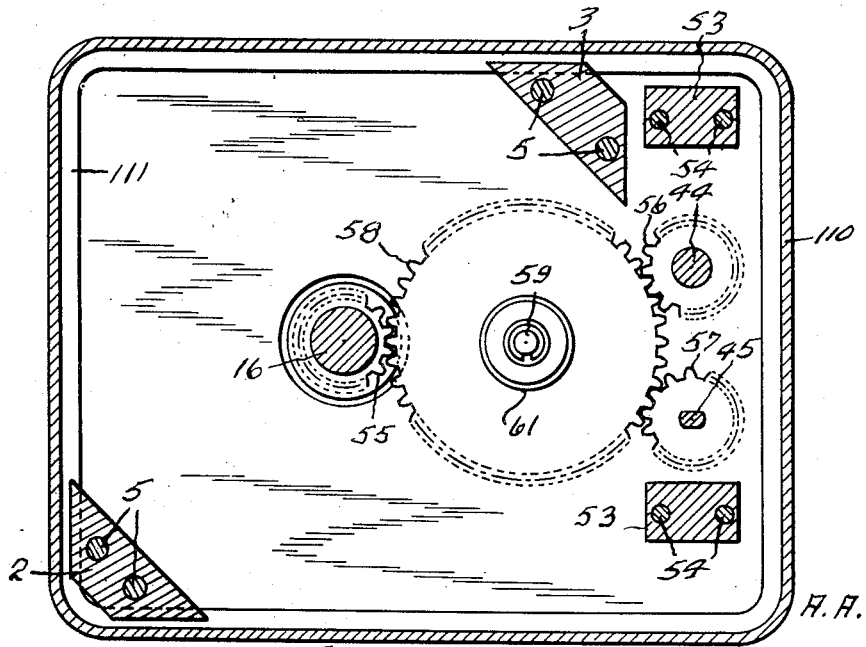
Fig. 6 is a horizontal section on the line 6—6 of Fig. 4.

Referring now to the drawings in detail by reference characters, the numeral 1 indicates a base having a pair of diagonally spaced upwardly extending posts 2 and 3 secured thereto by bolts 5. A bridge plate 6 is secured to the upper ends of the posts 2 and 3 by screws 7, and a terminal block 8 is secured to the top of the bridge plate 6 by cap screws 9. The terminal block 8 is provided with terminal posts 10, 11 and 12 which extend downwardly therefrom through apertures 14 and 15 in the bridge plate 6.

A vertical shaft 16 having a collar 17 integral therewith is rotatably supported by bearings 18 and 19 carried by the base 1 and bridge plate 6 respectively. A slip ring holder 20 of suitable insulating material, having a hub 21 around the lower end thereof is secured on the shaft 16 for rotation therewith by cap screws 22 which extend through the hub 21 and into the collar 17. At the upper end thereof the slip ring holder 20 is provided with a pair of spaced similar slip rings 23 and 24 which are rigidly secured thereon.

A drum 25 having a medially disposed internal web or spider 26 is permanently secured to the slip ring holder 20 concentrically therewith and to the shaft 16 by having the web or spider 26 molded about the hub 21. The slip ring holder 20, the slip rings 23 and 24 and the drum 25 will therefore all be rotated in unison by and with the rotation of the shaft 16; and the shaft 16 may be rotated either manually or by other means such as synchros or servos depending upon the particular use to which the mechanism is applied. The circumference of the drum 26 is provided with a helical groove 27 which extends substantially from one end thereof to the other end thereof, and in which a resistance element in the form of a wire 28 is disposed. One end 29 of the resistance element 28 is electrically connected to the slip ring 23 by a conductor 30 and the other end 31 of the resistance element 28 is electrically connected to the slip ring 24 by a conductor 32.

The terminal post 10 is secured to the terminal block 8 by a conductor bolt 33 which is carried by the terminal block 8 and extends down into the terminal post 10; the terminal post 11 is secured to the terminal block 8 by a conductor bolt 34 which is carried by the terminal block 8 and extends down into the terminal post 11; and the terminal post 12 is secured to the terminal block 8 by a conductor bolt 35 which is carried by the terminal block and extends down into the block 12. One side of a source of current is connected to the bolt 33 by a screw 36, and the other side thereof is connected to the bolt 34 by a screw 37. A pair of brushes 38 which are maintained in contact with the slip ring 23 are secured to the terminal post 10 and electrically connected to the conductor bolt 33 by a bolt 39; and a pair of similar brushes 40 which are maintained in contact with the slip ring 24 are secured to the terminal post 11 and electrically connected to the conductor bolt 34 by a bolt 41. It will therefore be seen that current may flow from one side of a source of current through the conductor bolt 33, brushes 38, slip ring 23, conductor 30, resistance wire 28, conductor 32, brushes 40, slip ring 24, conductor bolt 34 and back to the other side of the source of current as the drum 25 and slip rings 23 and 24 are rotated by the shaft 16.

In order to take off current from any point along the resistance element 28 and therefore provide a potentiometer which is generally known as a multiple turn potentiometer having infinite resolution a stylus 42 is provided which is always maintained in contact with the resistance wire 28 during rotation of the drum 25 and slip rings 23 and 24 in either direction by mechanism 43 now to be described.

The mechanism 43 comprises a screw shaft 44 and an auxiliary ratchet shaft 45 on which a carriage 46 is reciprocally mounted for back and forth movement adjacent the periphery of the drum 25. The screw shaft 44 is rotatably supported parallel to the main shaft 16 by bearings 47 and 48; and the auxiliary shaft 45 is rotatably supported parallel to the main shaft 16 and screw shaft 44 by bearings 49 and 50. The bearings 47 and 49 are mounted in the base 1 and the bearings 48 and 50 are mounted in a bridge plate 51 which is secured by bolts 52 to and between the upper ends of a pair of spaced parallel posts 53 which are secured to the base 1 by bolts 54 and extend upwardly therefrom. The shafts 44 and 45 are rotated by the main shaft 16 in unison therewith by a gear 55 which is secured to the shaft 16 adjacent the base 1, gears 56 and 57 which are secured to the lower ends of the screw shaft 44 and auxiliary shaft 45 respectively, and an intermediate gear 58 which meshes with the gear 55 and the gears 56 and 57. The intermediate gear 58 is rotatably mounted upon a pivot stud 59, which is secured to the base 1 and extends upwardly therefrom, by means of a pair of bearings 60 which are secured in the hub 61 of the gear 58. The screw shaft 44 extends through a complementary threaded bore 62 in the carriage 46 and the auxiliary shaft 45, which is provided with a pair of opposed flat surfaces 63 throughout the length thereof, extends through a complementary smooth bore 64 in the carriage 46, which is spaced from and parallel to the bore 63. Rotation of the screw shaft 44 in first one direction and then the other will therefore drive the carriage 46 back and forth between the upper and lower ends of the drum 25 with the carriage 46 sliding on the auxiliary shaft 45 as it is rotated in unison with the main and screw shafts 16 and 44.

Intermediate the bores 62 and 64 the carriage 49 is provided with a threaded bore 65 which is disposed perpendicular to the bores 62 and 64. A threaded sleeve 66, having a hexagonal head 67, which is screwed in the bore 65, is adapted to be adjusted back or forth therein by rotation thereof and to be locked in adjusted position by a plug 68 which is mounted in a bore 69 and is adapted to be forced into engagement with the threads of the sleeve 66 by a set screw 70. The sleeve 66 is provided with a Teflon bushing 71 in which a stylus shaft 72 is rotatably mounted. A brass stylus cup 73 is secured to the lower end of the stylus shaft 72 and a copper slip ring 74 is secured to the upper end thereof. A Lucite gear 75 through which the stylus shaft 72 is rotated is secured on the shaft 72 between the bushing 71 and the slip ring 74. The stylus 42 is secured to the spring spoke 76 of a flat beryllium ring 77 which is secured concentrically in the cup 73 by screws 78. A pick-off leaf spring 79 is secured to a bolt 80 which is mounted in a Teflon bushing 81 which is disposed in a bore 82 adjacent one end of the carriage 46. The pick-off spring 79 which extends inwardly from the bolt 80 and over the slip ring 74 is provided with a pair of contacts 83 which are yieldingly maintained in contact with the slip ring 74 by the inherent resiliency of the pick-off spring 79. The terminal 84 of one end of a conductor 85 is also secured to the bolt 80 in electrical contact with the pick-off spring 79. The conductor 85 extends from the bolt 80 through a clamp 86 which is mounted on the bridge plate 51 and has the other end thereof connected by a bolt 87 to the conductor bolt 35 mounted in the terminal post 12. Between the bolt 80 and the clamp 86 the conductor 85 is provided with sufficient slack, as indicated at 88, to accommodate the back and forth movement of the carriage 46.

During operation the stylus shaft 72, and consequently the stylus cup 73, the stylus 42 and the slip ring 74 carried thereby, are always rotated in the same direction by the auxiliary or ratchet shaft 45, regardless of the direction of rotation of the auxiliary shaft 45 through mechanism which will now be described.

This mechanism comprises an idler gear 90 and a pair of similar ratchet gears 91 and 92. The idler gear 90 is rotatably mounted in mesh with the gear 75 secured to the stylus shaft 72, upon a stud shaft 93 carried by the carriage 46 adjacent the stylus shaft 72. The ratchet gear 91 is rotatably mounted upon a hub 94, which is slidably but non-rotatably mounted upon the auxiliary shaft 45 at one side of the axis of the gear 90, in a slot 96 in one end of the carriage 46 which is disposed adjacent one side of the carriage 46 perpendicular to and intersecting the bore 64, and the ratchet gear 92 is rotatably mounted upon a hub 97, which is slidably but non-rotatably mounted upon the auxiliary shaft 45 in a slot 98 which is similar to the slot 96 and is disposed in the carriage 46 adjacent the other side thereof and on the opposite side of the axis of the gear 90. The gears 91 and 92 are disposed in constant square mesh with the gear 90 on opposite sides of the axis thereof. It will therefore be seen that if the gear 96 is rotated in one direction by the gear 91, when it is rotating in one direction, it will also be rotated in the same direction by the gear 92 when it, the gear 92, is rotated in the opposite direction to the rotation of the gear 91. The bores 99 in the hubs 94 and 97 respectively, through which the auxiliary ratchet shaft 45 extends, are each provided with flattened sections 100 which engage the flattened section 63 on the shaft 45 so that the hubs 94 and 97 may slide upon the shaft 45, but will be rotated in unison therewith. The hub 94 has a pawl 101 rigidly secured thereon for rotation therewith, and the hub 97 has a pawl 102 similar to the pawl 101 rigidly secured thereon for rotation therewith. The pawls 101 and 102 are each provided with four spring arms 103 which terminate in claws 104. The ratchet gears 91 and 92 are each provided in the opposed faces thereof with an annular row of ratchet teeth 105 which are adapted to be engaged, respectively, by the claws 104 on the arms 103 of the ratchets 101 and 102. The claws 104 of the ratchets 101 and 102 are yieldingly pressed into engagement with the ratchet teeth 105 on the associated ratchet gears 91 and 92 by Belleville springs 106, which are mounted upon the auxiliary shaft 45 in the slots 96 and 98 in the carriage 46. When the auxiliary ratchet shaft 45 is rotated in one direction, the claws 104 of the ratchet 101 will engage the ratchet teeth 105 of the ratchet gear 91 and rotate the ratchet gear 91 therewith, and the claws 104 of the ratchet 102 will ride over the ratchet teeth 105 of the ratchet gear 92; and when the auxiliary ratchet shaft 45 is rotated in the opposite direction, the claws 104 of the ratchet 102 will engage the ratchet teeth 105 of the ratchet gear 92 and rotate the ratchet gear 92 therewith, and the claws 104 of the ratchet 101 will ride over the ratchet teeth 105 of the ratchet gear 91. It will thus be seen that the gear 90 will always be rotated in the same direction by the ratchet shaft 45, regardless of the direction of rotation of the shaft 45, due to the fact that the ratchet gears 91 and 92 are disposed on opposite sides of the axis of the gear 90, and that only one ratchet gear 91 or 92 is rotated by the auxiliary ratchet shaft 45 during rotation thereof in either direction. Obviously, the stylus shaft 72 and the stylus 42 carried thereby will also be always rotated in the same direction through the meshing gears 90 and 75.

As previously stated, the continuous rotation of the stylus 42 in the same direction during operation eliminates all grooving of the stylus 42 due to its contact with the resistance wire 28.

The entire mechanism is enclosed by a cup shaped casing 110 which telescopes an upstanding flange 111 on the base 1 and is removably held in place by screws 112.

From the foregoing it will be apparent to those skilled in this art that I have provided a very simple and efficient mechanism for accomplishing the objects of the invention.

It is to be understood that I am not limited to the specific construction shown and described herein as various modifications may be made therein within the spirit of the invention and the scope of the appended claims.

I claim:

1. A potentiometer of the character described, comprising a rotatably mounted drum, a resistance wire helically wound about the outer surface of said drum a plurality of turns, a reciprocally mounted carriage operatively associated with said drum for back and forth movement longitudinally thereof, a stylus rotatably mounted on said carriage in position to engage said wire, means yieldingly holding said stylus in contact with said wire under a predetermined pressure, means by which said drum is rotated and said carriage is moved back and forth in timed relation to each other whereby said stylus is always maintained in contact with said wire as said stylus is moved back and forth across said drum as said drum is rotated, and means by which said stylus is constantly rotated in the same direction during the rotation of said drum and the reciprocation of said carriage irrespective of the direction of movement of said carriage and the rotation of said drum.

2. In an instrument of the character described, having a rotatably mounted drum which is adapted to be rotated in first one direction and then the other, and on which a resistance element is helically wound in a plurality of turns, a stylus, and means by which said stylus is maintained in contact with said resistance element during the rotation of said drum in either direction, said means comprising a reciprocally mounted carriage which is disposed transversely of said drum, means reciprocating said carriage back and forth longitudinally of said drum in timed relation to the rotation of said drum, a stylus shaft rotatably and longitudinally adjustably mounted in said carriage, said stylus being yieldingly secured to said shaft by resilient spring means, and means carried by said carriage by which said stylus is constantly rotated in the same direction as it is moved back and forth along said drum in a plane which includes the axis of said drum.

3. A potentiometer of the character described comprising a rotatably mounted main shaft, a drum mounted on said shaft for rotation therewith, a resistance element helically wound a plurality of turns about the outer surface of said drum, a screw shaft and an auxiliary shaft rotatably mounted in fixed position parallel to said main shaft, a carriage threaded onto said screw shaft and slidably mounted on said auxiliary shaft for back and forth movement longitudinally of said drum, a stylus rotatably mounted on said carriage in contact with said resistance element, means by which said stylus is maintained in contact with said resistance element under a constant predetermined pressure, means by which said main shaft and said screw shaft are rotated in first one direction and then the other in timed relation to each other whereby said carriage is moved back and forth by said screw shaft and said stylus is maintained in contact with said resistance element as said drum is rotated by said main shaft, means by which said auxiliary shaft is rotated, and means mounted in said carriage through which said stylus is rotated by said auxiliary shaft.

4. A potentiometer of the character described comprising a rotatably mounted main shaft, a drum mounted on said shaft for rotation therewith, a resistance element helically wound a plurality of turns about the outer surface of said drum, a screw shaft and an auxiliary shaft rotatably mounted in fixed position parallel to said main shaft, a carriage threaded onto said screw shaft and slidably mounted on said auxiliary shaft for back and forth movement longitudinally of said drum, a stylus shaft rotatably mounted in said carriage with the axis thereof perpendicular to and intersecting the axis of said main shaft, a stylus yieldingly secured to the inner end of said stylus shaft for rotation therewith in contact wtih said resistance element, means by which said stylus shaft may be adjusted toward and away from said drum, means by which said main shaft and said screw shaft are rotated in first one direction and then the other in timed relation to each other whereby said carriage is moved back and forth by said screw shaft and said stylus is maintained in contact with said resistance element as said drum is rotated by said main shaft, means by which said auxiliary shaft is rotated, and means mounted in said carriage through which said stylus is rotated by said auxiliary shaft.

5. A potentiometer of the character described comprising a rotatably mounted main shaft, a drum mounted on said shaft for rotation therewith, a resistance element helically wound a plurality of turns about the outer surface of said drum, a screw shaft and an auxiliary shaft rotatably mounted in fixed position parallel to said main shaft, a carriage threaded onto said screw shaft and slidably mounted on said auxiliary shaft for back and forth movement longitudinally of said drum, a stylus rotatably mounted on said carriage in contact with said resistance element, means by which said stylus is maintained in contact with said resistance element under a constant predetermined pressure, means by which said main shaft, said auxiliary shaft and said screw shaft are all rotated in timed relation to each other in first one direction and then in the opposite direction whereby said carriage is reciprocated back and forth by said screw shaft and said stylus is maintained in contact with said resistance element as said drum is rotated by said main shaft, and means carried by said carriage through which said stylus is always rotated in the same direction by said auxiliary shaft regardless of the direction of rotation of said auxiliary shaft.

6. A potentiometer of the character described comprising a rotatably mounted main shaft, a drum mounted on said shaft for rotation therewith, a resistance element helically wound a plurality of turns about the outer surface of said drum, a screw shaft and an auxiliary shaft rotatably mounted in fixed position parallel to said main shaft, a carriage threaded onto said screw shaft and slidably mounted on said auxiliary shaft for back and forth movement longitudinally of said drum, a stylus shaft rotatably mounted in said carriage with the axis thereof perpendicular to and intersecting the axis of said main shaft, a stylus yieldingly secured to the inner end of said stylus shaft for rotation therewith in contact with said resistance element, means by which said stylus shaft may be adjusted toward and away from said drum, means by which said main shaft, said auxiliary shaft and said screw shaft are all rotated in timed relation to each other in first one direction and then in the opposite direction whereby said carriage is reciprocated back and forth by said screw shaft and said stylus is maintained in contact with said resistance element as said drum is rotated by said main shaft, and means carried by said carriage through which said stylus is always rotated in the same direction by said auxiliary shaft regardless of the direction of rotation of said auxiliary shaft.

7. A potentiometer as defined in claim 6 in which said last mentioned means comprises a gear rotatably mounted on said carriage through which said stylus shaft is rotated, a pair of spaced opposed similar ratchet gears rotatably mounted on said auxiliary shaft, one of which is disposed in constant mesh with said rotatably mounted gear on one side of the axis of rotation thereof and the other of which is disposed in constant mesh with said rotatably mounted gear on the opposite side of the axis of rotation thereof, means by which one of said opposed similar ratchet gears is connected to said auxiliary shaft for rotation therewith when said auxiliary shaft is rotated in one direction, and means by which the other of said opposed similar ratchet gears is connected to said auxiliary shaft for rotation therewith when said auxiliary shaft is rotated in the opposite direction.

8. A potentiometer as defined in claim 6 in which said last mentioned means comprises a gear which is mounted on said carriage for rotation about an axis perpendicular to the axis of rotation of said auxiliary shaft and through which said stylus shaft is rotated, a pair of opposed spaced similar disks rotatably mounted on said auxiliary shaft one of which is disposed on one side of the axis of rotation of said gear and the other of which is disposed on the opposite side of the axis of rotation of said gear, each of said disks being provided with gear teeth around the periphery thereof which are disposed in constant mesh with said gear, and each of said disks being provided with an annular row of ratchet teeth on the opposed faces thereof, a pair of similar pawls mounted on said auxiliary shaft for rotation therewith, one of said pawls being adapted to engage the ratchet teeth on one of said disks when said auxiliary shaft is rotated in one direction to thereby rotate said disk with said auxiliary shaft, and the other of said pawls being adapted to engage the ratchet teeth on the other of said disks when said auxiliary shaft is rotated in the opposite direction and thereby rotate the said other of said disks with said auxiliary shaft.

9. A potentiometer as defined in claim 6 in which said last mentioned means comprises a gear which is mounted on said carriage for rotation about an axis perpendicular to the axis of rotation of said auxiliary shaft, a pair of similar hubs slidably splined to said auxiliary shaft for rotation therewith, one of said hubs being disposed on one side of the axis of rotation of said gear and the other of said hubs being disposed on the opposite side of the axis of rotation of said gear, a pair of similar disks one of which is rotatably mounted on each of said hubs, each of said disks being provided with gear teeth around the periphery thereof which are disposed in constant mesh with said gear, and each of said disks being provided with an annular row of ratchet teeth on the opposed faces thereof, a pair of similar pawl means one of which is rigidly secured to one of said hubs and the other of which is rigidly secured to the other of said hubs, one of said ratchet means being adapted to engage the ratchet teeth on one of said disks when said auxiliary shaft is rotated in one direction and thereby rotate the said one of said disks with said auxiliary shaft, and the other of said ratchet means being adapted to engage the ratchet teeth on the other of said disks when said auxiliary shaft is rotated in the opposite direction and thereby rotate the said other of said disks with said auxiliary shaft.

References Cited in the file of this patent
UNITED STATES PATENTS

| | | |
|---|---|---|
| 574,231 | Werner | Dec. 29, 1896 |
| 606,012 | Hogan | June 21, 1898 |
| 1,684,013 | De Pue | Sept. 11, 1928 |